(12) United States Patent
Lutz

(10) Patent No.: US 6,450,307 B2
(45) Date of Patent: Sep. 17, 2002

(54) PRESSURE VESSEL, IN PARTICULAR FOR A VIBRATION DAMPER

(75) Inventor: Dieter Lutz, Schweinfurt (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/880,351

(22) Filed: Jun. 13, 2001

(30) Foreign Application Priority Data

Jun. 14, 2000 (DE) .......................... 100 29 150

(51) Int. Cl.$^7$ ................................................ F16F 9/00
(52) U.S. Cl. .............................. 188/322.19; 267/64.23; 267/64.27; 138/30
(58) Field of Search ........................ 267/64.11, 64.23, 267/64.25, 64.28, 64.27; 138/26, 30, 31; 60/413, 415, 416; 188/269, 298, 314, 315, 322.19; 303/87, DIG. 11

(56) References Cited

U.S. PATENT DOCUMENTS

| | | | | |
|---|---|---|---|---|
| 2,856,035 A | | 10/1958 | Rohacs | |
| 3,027,600 A | * | 4/1962 | Stormer et al. | 267/64.28 |
| 3,123,347 A | | 3/1964 | Stormer et al. | |
| 3,625,321 A | * | 12/1971 | Lutz | 188/298 |
| 3,901,359 A | * | 8/1975 | Jentsch | 188/269 |
| 4,449,552 A | * | 5/1984 | Porel | 138/30 |
| 4,742,898 A | * | 5/1988 | Lee | 188/315 X |
| 4,880,213 A | * | 11/1989 | Shinbori et al. | 267/64.27 |
| 5,215,124 A | * | 6/1993 | Hattori et al. | 138/30 |
| 5,323,953 A | * | 6/1994 | Adderley et al. | 228/157 |
| 5,505,228 A | * | 4/1996 | Summerfield | 138/30 |
| 5,543,194 A | * | 8/1996 | Rudy | 428/69 |
| 5,618,629 A | * | 4/1997 | Takamatsu et al. | 428/475.5 |
| 5,645,922 A | * | 7/1997 | Le Rossignol | 428/226 |
| 6,016,841 A | * | 1/2000 | Larsen | 138/30 |
| 6,116,585 A | | 9/2000 | Lutz | 267/64.27 |

* cited by examiner

Primary Examiner—Pam Rodriguez
(74) Attorney, Agent, or Firm—Cohen, Pontani, Lieberman & Pavane

(57) ABSTRACT

A pressure vessel which is filled with at least one medium which is prestressed by a mass of gas which is enclosed in a variable-shape envelope, in particular for volume compensation in a vibration damper. The envelope includes a wall in which a pressurized gas is enclosed, the wall being at least partially formed from a barrier layer and the envelope being composed of a plurality of individual parts. An outside coating, which seals an end face of the envelope, is present at least at an edge-side contact region of the individual parts of the envelope.

16 Claims, 4 Drawing Sheets

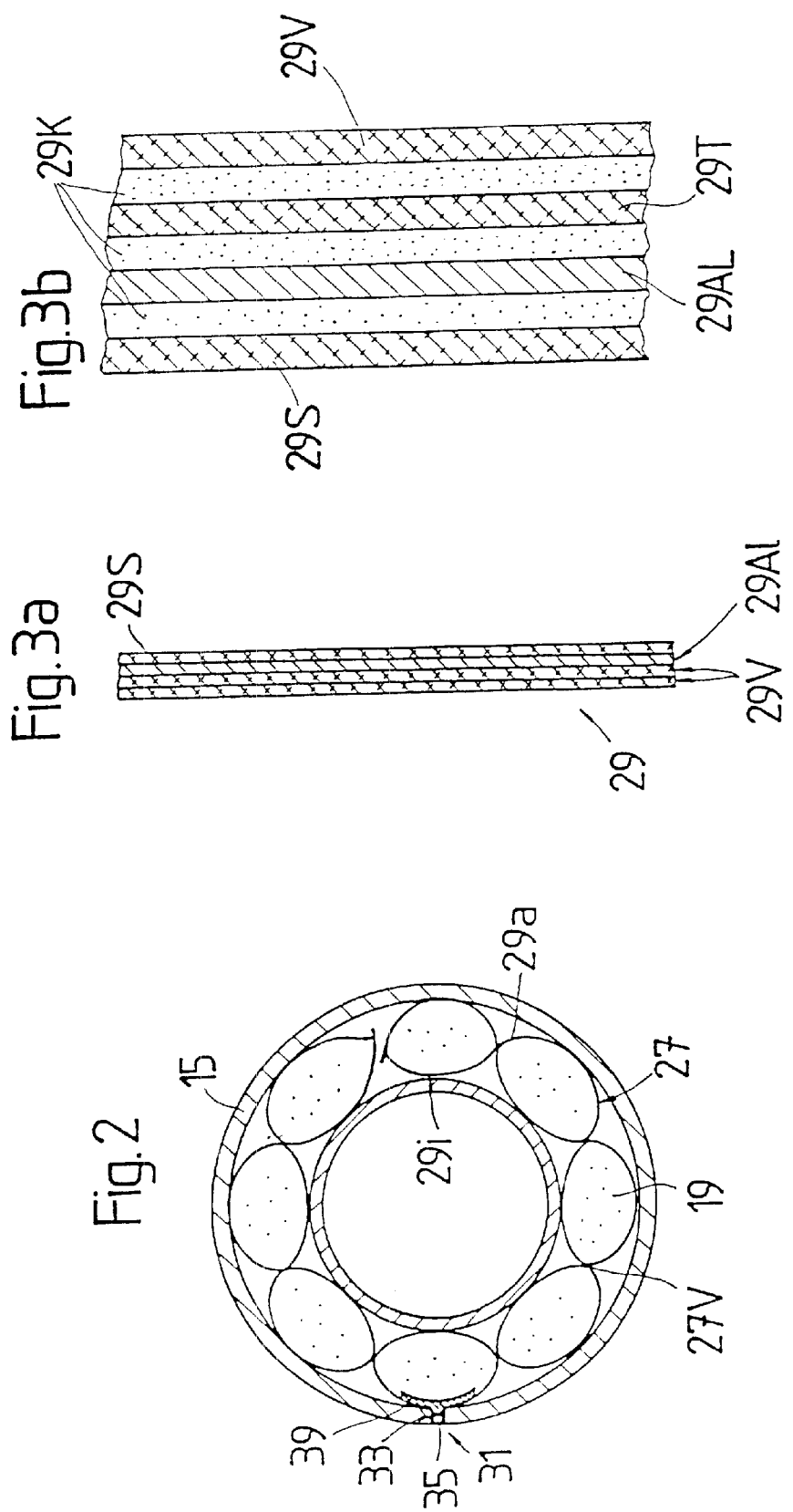

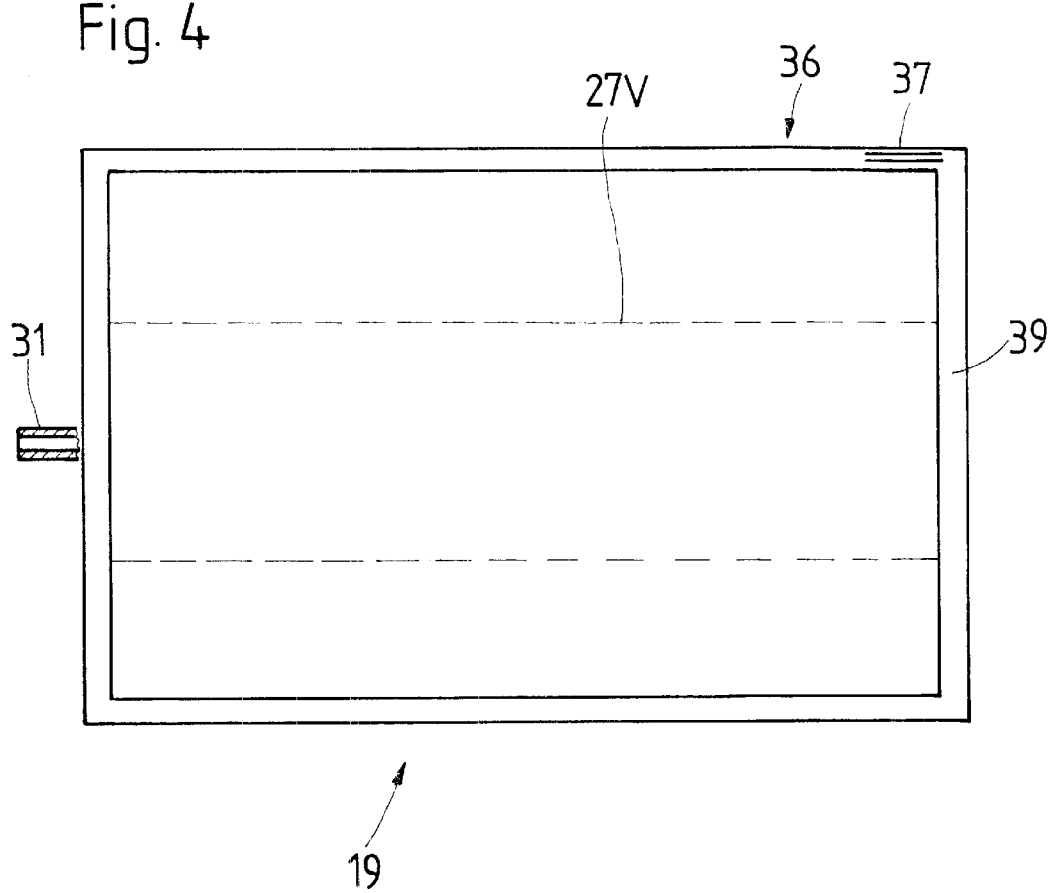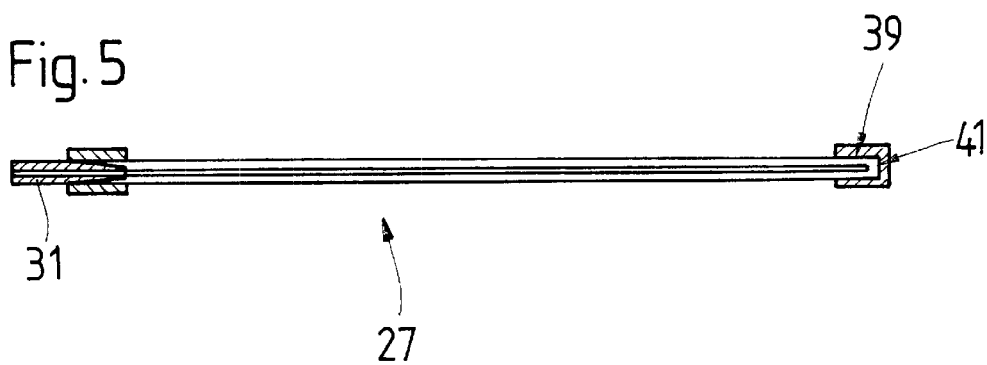

PRESSURE VESSEL, IN PARTICULAR FOR A VIBRATION DAMPER

BACKGROUND OF THE INVENTION

1. Field of the Invention

The invention relates to a pressure vessel, in particular for a vibration damper, filled with a medium and having a variable-shape envelope containing a mass of gas for volume compensation.

2. Description of the Related Art

U.S. Pat. No. 6,116,585 discloses a pressure vessel which is filled with at least one medium which is prestressed by a mass of gas which is enclosed in a variable-shape envelope, in particular for volume compensation in a vibration damper, having a wall in which a pressurized gas is enclosed. The wall of the envelope is at least partially formed from a barrier layer and the envelope being composed of a plurality of individual parts.

On account of the gastight barrier layer, the emergence of gas from the pressure vessel is considerably improved compared to simple pressure vessels with a rubber membrane. Nevertheless, over the intended service life, it is possible to detect a loss of gas from the pressure vessel, and the aim is for this loss to be reduced further. One procedure consists in the use of a plurality of gastight barrier layers. Alternatively, the barrier layers may be designed with a protective layer which can withstand particularly high thermal loads. Extensive tests have shown that the temperature at which the pressure vessel is used has a decisive effect on the seal. However, heat-resistant protective layers of this nature are relatively expensive, and consequently they tend not to be suitable for large-series production.

SUMMARY OF THE INVENTION

It is an object of the present invention to minimize the problems which are known from the prior art and are caused by the loss of gas from the pressure vessel.

According to the invention, the object is achieved by providing an outside coating, which seals an end face of the envelope, at least at an edge-side contact region of the individual parts of the envelope.

The envelope is formed by at least two individual parts which are welded together. The previous weak point of the edges at which the gastight barrier layer is only in superficial contact is significantly improved by the additional coating.

To achieve the maximum possible compatibility of the outside coating, with the envelope comprising a plurality of layers, the material for the coating of the end face is similar to the outside layer of the envelope.

With a view to saving on use of raw materials, but also to keeping the envelope as flexible as possible, the edge-side coating is restricted to a strip of $\leq 5$ mm.

In connection with this measure, the envelope has a prestamped form which is adapted to the intended installation position, the coating being made on the prestamped envelope. The stresses which occur within the coatings can be significantly reduced.

In a further advantageous configuration, the envelope has an injection-molded filling connection.

In order to ensure that there are no additional leakage points, the filling connection is arranged in the edge region. For this purpose, the filling connection has a conical contact region, on which in each case a section of the edges of the envelope comes to bear.

In a further advantageous configuration, the edge-side coating is connected to the filling connection.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2 shows a section through the vibration damper and the enclosed mass of gas, FIGS. 3a and 3b show sections through the wall of the envelope, FIG. 4 shows a view of the enclosed mass of gas, FIG. 5 shows a cross section through the enclosed mass of gas.

DETAILED DESCRIPTION OF THE PRESENTLY PREFERRED EMBODIMENTS

Figure 1:
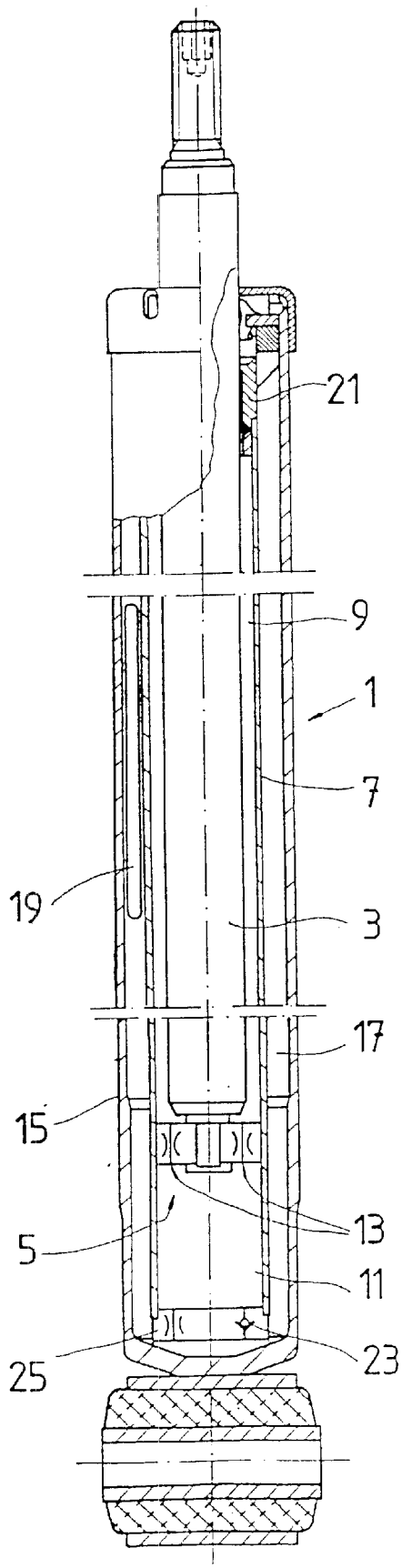
FIG. 1 shows an application example of the enclosed mass of gas for a vibration damper.

FIG. 1 shows a vibration damper 1 of two-tube design which is known per se and in which a piston rod 3 with a piston 5 is guided in an axially movable manner in a pressure tube 7. The piston 5 separates the pressure tube into an upper working chamber 9 and a lower working chamber 11, the two working chambers being connected via damping valves 13 in the piston.

The pressure tube 7 is encased by a vessel tube 15, the inner wall of the vessel tube and the outer wall of the pressure tube forming a compensation space 17, which is completely filled with damping medium and an enclosed mass of gas 19 as far a piston rod guide 21. At the lower end of the working space 11 there is a base which, if appropriate, has a nonreturn valve 23 and a damping valve 25.

In the event of a movement of the piston rod, the displaced piston rod volume is compensated for by a change in volume of the enclosed mass of gas.

FIG. 2 shows a section through the vibration damper 1 in the region of the enclosed mass of gas 19. The enclosed mass of gas comprises an envelope 27 with a wall 29 which is pressure-filled with a gas, in particular nitrogen. Alternatively, it is possible to use $CO_2$, or, if assembly is sufficiently rapid, a liquefied gas. The wall 29 has an inner wall 29i and an outer wall 29a, which in turn form a start and an end. In this example of an application, the enclosed mass of gas is fitted into the compensation space 17 in the form of an arc of a circle. The sectional illustration shows chambers of the enclosed mass of gas arranged in a row. The chambers are formed by joins 27V, which run parallel to the axis of the vibration damper, between the inner wall 29i and the outer wall 29a, the joins being formed only in sections so that all the chambers can exchange gas with one another and the same operating pressure prevails in each chamber. As the operating pressure in the working spaces rises, the chambers of the enclosed mass of gas are compressed. The wall is not elastically deformed, since the internal pressure and external pressure are identical. Only the distances between the joins 27V on the pitch circle of the joins increase, with the result that the inner and outer walls are pressed toward one another.

The envelope comprises a filling connection 31 which is accessible via a filling opening 33 in the vessel tube. During assembly of the vibration damper, the unfilled envelope is placed into the vessel tube 15, the filling connection 31 being fastened into the filling opening. Then, the pressure tube 7 is introduced. Next, the entire vibration damper is filled with oil, the volume of oil filling depending on the subsequent operating pressure, which is determined by the enclosed mass of gas when the piston rod is at a standstill. After the filling operation, the filling opening can be closed off by means of a ball 35 which is pressed in.

FIG. 3a shows a section through the wall 29, it being possible for the inner wall 29i and the outer wall 29a to consist of the same material or to have the same structure. The core component of the wall is a metal foil, in particular an aluminum foil 29Al, which is only a few $\mu$m thick. Rolled aluminum is particularly suitable. The aluminum foil serves as a barrier layer which is responsible for providing a seal for the enclosed gas. On the outside, the aluminum foil is coated by a protective film 29S. This protective film promotes stability, increases the tear strength and prevents excessive creasing. The thickness of this layer is similar to that of the aluminum foil and the layer consists, for example, of PET or polyamide.

On the inside, the wall has a weldable coating 29V. The weldable coating may also be of multilayer, for example two-layer, design and its thickness may for example be four to five times that of the aluminum foil. In the case of a multilayer coating 29V, the individual layers are if appropriate stretched and applied to one another crosswise. The result is a high strength and dimensional stability, and in particular internal stresses are compensated for. PP and PA have proven suitable materials. The layer thickness is approximately 50 to 100 $\mu$m. If PA is used for both the protective layer and the welding layer, a sealing weld can be executed for the envelope. During a sealing weld, the protective layer is laid so that it overlaps the welding layer and is welded by the supply of heat.

FIG. 3b shows the construction of the wall of the envelope, which additionally has a substrate layer 29T. This substrate layer provides the strength in all directions of loading on the envelope 29. When using the substrate layer, the metal foil 29Al can be reduced to the absolute minimum. As a result, the envelope becomes more flexible and acquires elastomeric properties. Furthermore, the substrate layer protects the metal foil during the welding operation. It must be ensured that no operating medium from the pressure vessel comes into contact with the metal foil. Depending on the operating medium, the metal foil may be subject to chemical attack. It is desirable for the metal foil 29Al to be arranged in the neutral part of the wall of the envelope, in order to optimize flexural stresses.

An adhesive layer 29K, for example of PU, may be applied between the other layers, this adhesive layer being responsible for ensuring that the layers are held securely together. The adhesive layer may be applied in the form of a conventional adhesive or may be inlaid as an adhesive film. Alternatively, the individual layers may also be calendered.

FIG. 4 shows an unwound gas cushion 19. Weld seams 37 are formed at the edge 36, enabling a continuous body to be formed from the inner wall 29i and the outer wall 29a. The weldable coating 29V, cf. FIG. 3, is required for the weld seams 37. It can also be seen from FIG. 4 why an inner wall and an outer wall are used.

This view also shows the joins 27V. The joins are only formed in sections, so that adjacent chambers can exchange volume. It is not absolutely necessary for joins to be in the form of seams. Individual joining points are also conceivable.

As can be seen when FIGS. 4 and 5 are considered together, the edge 36 is provided with an outside coating 39, which seals an encircling end face 41 of the envelope at least in sections. The coating 39 has deliberately been kept within a narrow range of 2 to 5 mm. On the one hand, the intention is to save material, and on the other hand an excessively wide edge would impair the flexibility of the envelope. To achieve the best possible contact with respect to the coatings 29V, the edge-side coating of the end faces is selected at least from a similar coating material, and preferably from the same coating material.

Figure 6:
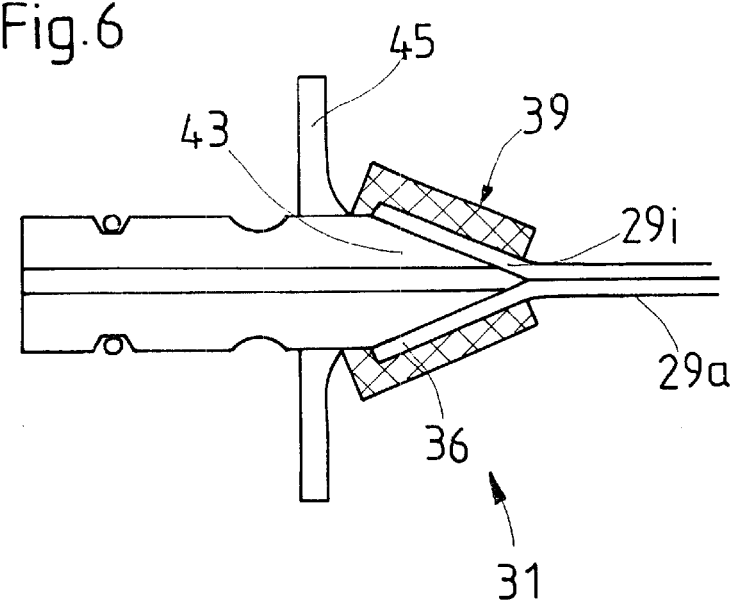
FIG. 6 shows the filling connection in detail.

As can also be seen from FIGS. 4 and 5, the filling connection 31 is also arranged at the edge 36 of the envelope. FIG. 6 shows the filling connection 31 as a detail. The filling connection is injected-molded in the envelope. There are various procedures used for this purpose. It is important to ensure, in the interior of the envelope, that the material which is injected into a mold cannot escape uncontrollably into the envelope. For this purpose, it is possible to use mating holders (not shown) which in practice form one wall of the mold and from which envelopes which have not yet been completely closed can be removed. Alternatively, the envelope can be prefilled with a compressed gas. The gas cushion then acts as a wall of the mold.

The filling connection 31 has a conical contact region 43, on which the edge 36, which is still open for the injection operation, comes to bear. Depending on the acceptable outlay on tooling, the edge-side coating should also extend to the region of the filling connection, the edge-side coating 39 then being joined to the filling connection 31. Therefore, the filling connection should comprise a material which joins to or is as similar as possible to the coating. As an additional feature, the filling connection may include a reinforcement ring 45, which can serve as a bearing surface on the pressure body. Furthermore, the envelope with the reinforcement ring can be picked up more easily by a robot without causing damage.

Figure 7:
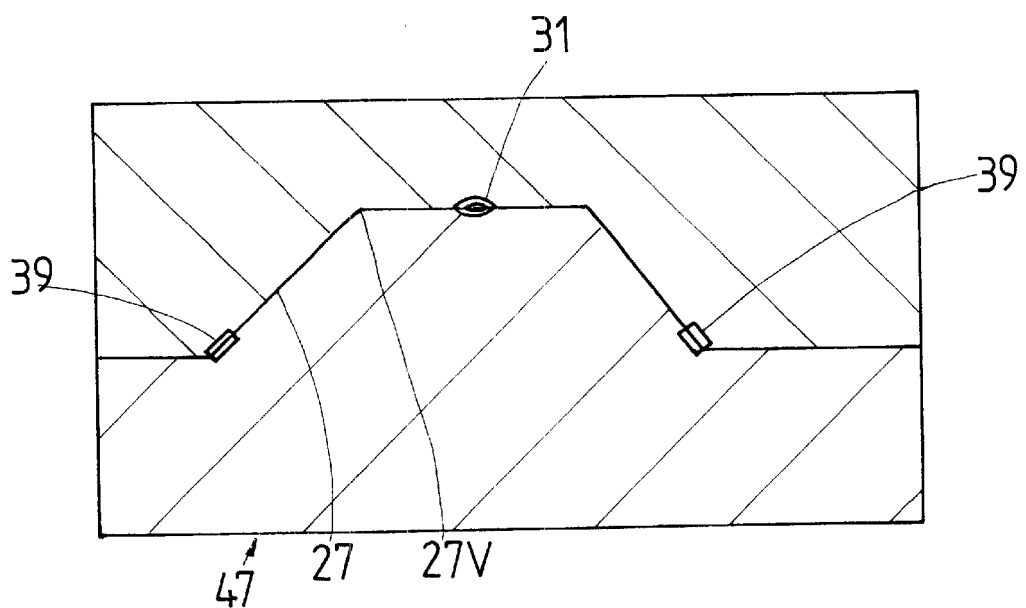
FIG. 7 shows an injection mold for the envelope.

FIG. 7 provides a highly simplified view of an injection mold 47 for the edge-side coating 39 of the envelope 27. As can be seen from the parting joint of the injection mold, the envelope is formed from a completely planar layer into a shape which is adapted to the subsequent installation position.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A vibration damper comprising
a pressure vessel defining a compensation space which is filled with a damping medium, and
a variable-shape envelope enclosing a mass of gas immersed in said medium, said envelope comprising an inner wall and an outer wall, each of said walls comprising a plurality of layers including a barrier layer and a welding layer and being defined by an edge, said welding layers of said inner wall and said outer wall being welded together at said edges to form an end face transverse to the layers, said envelope further comprising an outside coating sealing said end face.

2. A vibration damper as in claim 1 wherein each of said inner wall and said outer wall comprises an outside layer, said outside coating being made of a material which is the same as said outside layer.

3. A vibration damper as in claim 1 wherein said outside coating is restricted to a strip less than or equal to 5 mm from said edge.

4. A vibration damper as in claim 1 wherein said envelope has a molded form which is adapted to fit in said compensation space.

5. A vibration damper as in claim 1 wherein said envelope further comprises an injection molded filling connection.

6. A vibration damper as in claim 5 wherein said filling connection is molded between said inner wall and said outer wall at said end face.

7. A vibration damper as in claim 6 wherein said filling connection comprises a conical contact section which is received between said inner and outer walls.

8. A vibration damper as in claim 7 wherein said outside coating is applied to said filling connection.

9. A pressure vessel defining a compensation space which is filled with a damping medium, said medium having immersed therein a variable-shape envelope enclosing a mass of gas, said envelope comprising an inner wall and an outer wall, each of said walls comprising plurality of layers including a barrier layer and a welding layer and being defined by an edge, said welding layers of said inner wall and said outer wall being welded together at said edges to form an end face transverse to the layers, said envelope further comprising an outside coating sealing said end face.

10. A pressure vessel as in claim 9 wherein each of said inner wall and said outer wall comprises an outside layer, said outside coating being made of a material which is the same as said outside layer.

11. A pressure vessel as in claim 9 wherein said outside coating is restricted to a strip less than or equal to 5 mm from said edge.

12. A pressure vessel as in claim 9 wherein said envelope has a molded form which is adapted to fit in said compensation space.

13. A pressure vessel as in claim 9 wherein said envelope further comprises an injection molded filling connection.

14. A pressure vessel as in claim 13 wherein said filling connection is molded between said inner wall and said outer wall at said end face.

15. A pressure vessel as in claim 14 wherein said filling connection comprises a conical contact section which is received between said inner and outer walls.

16. A pressure vessel as in claim 15 wherein said outside coating is applied to said filling connection.

* * * * *